(12) United States Patent
Rogers

(10) Patent No.: US 7,020,726 B2
(45) Date of Patent: Mar. 28, 2006

(54) METHODS AND APPARATUS FOR SIGNALING TO SWITCH BETWEEN DIFFERENT BUS BANDWIDTHS

(75) Inventor: Jeffrey M. Rogers, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 385 days.

(21) Appl. No.: 10/113,529

(22) Filed: Mar. 29, 2002

(65) Prior Publication Data

US 2002/0178315 A1 Nov. 28, 2002

Related U.S. Application Data

(60) Provisional application No. 60/293,717, filed on May 24, 2001.

(51) Int. Cl.
  *G06F 13/00* (2006.01)
(52) U.S. Cl. .................. 710/300; 710/305; 710/62; 710/66
(58) Field of Classification Search ........... 710/300, 710/305, 66, 62
  See application file for complete search history.

(56) References Cited

U.S. PATENT DOCUMENTS

| | | | | |
|---|---|---|---|---|
| 4,246,637 A | * | 1/1981 | Brown et al. .................. 710/62 |
| 4,309,754 A | * | 1/1982 | Dinwiddie, Jr. ............. 710/307 |
| 4,509,113 A | * | 4/1985 | Heath .......................... 710/66 |
| 4,525,804 A | * | 6/1985 | Mosier et al. ................ 710/66 |
| 4,593,373 A | * | 6/1986 | Kiuchi et al. ............... 708/518 |
| 4,716,527 A | * | 12/1987 | Graciotti ...................... 703/25 |
| 5,014,236 A | * | 5/1991 | Pogorzelski et al. ......... 710/66 |
| 5,101,489 A | * | 3/1992 | Sato et al. .................. 710/307 |
| 5,113,369 A | * | 5/1992 | Kinoshita .................... 710/307 |
| 5,373,467 A | * | 12/1994 | Wang ...................... 365/189.02 |
| 5,481,207 A | * | 1/1996 | Crafts .......................... 326/86 |
| 5,504,927 A | * | 4/1996 | Okamoto et al. ............. 710/58 |
| 5,537,659 A | * | 7/1996 | Nakao ........................ 710/307 |
| 5,553,244 A | * | 9/1996 | Norcross et al. ............ 710/100 |
| 5,727,184 A | * | 3/1998 | Richter et al. ................ 710/62 |
| 5,794,014 A | * | 8/1998 | Shetty et al. ................. 703/25 |
| 5,809,291 A | * | 9/1998 | Munoz-Bustamante et al. .......................... 713/501 |
| 6,047,120 A | * | 4/2000 | Bell .......................... 710/307 |
| 6,101,561 A | * | 8/2000 | Beers et al. .................. 710/66 |
| 6,134,621 A | * | 10/2000 | Kelley et al. ............... 710/311 |

(Continued)

OTHER PUBLICATIONS

TechWeb, defenition for "NOR" gate, http://www.techweb.com/encyclopedia/defineterm?term=nOR.*

(Continued)

*Primary Examiner*—Rehana Perveen
*Assistant Examiner*—Justin King
(74) *Attorney, Agent, or Firm*—Duft Bornsen & Fishman, LLP

(57) ABSTRACT

The present invention provides an apparatus and method for selecting bus-width formats. In an exemplary preferred embodiment of the invention, the circuit includes a bus controller configured to provide a first bus-width control signal to select a first bus-width. The circuit also includes a bus controller extension circuit configured to force the first bus-width control signal to a predetermined level when the bus controller is applied to a bus with a second bus controller that is incompatible with the first bus-width. Advantages of the invention include controlling a number of data bits to be transferred between a PCI device and a data bus that does not violate PCI specifications. Other advantages include a programmability of the PCI device to adapt to legacy systems as PCI technology progresses.

26 Claims, 6 Drawing Sheets

U.S. PATENT DOCUMENTS

| | | | | |
|---|---|---|---|---|
| 6,185,642 | B1* | 2/2001 | Beukema et al. | 710/60 |
| 6,191,607 | B1* | 2/2001 | Meng et al. | 326/37 |
| 6,381,664 | B1* | 4/2002 | Nishtala et al. | 710/305 |
| 6,405,276 | B1* | 6/2002 | Chen et al. | 710/310 |
| 6,457,091 | B1* | 9/2002 | Lange et al. | 710/314 |
| 6,519,555 | B1* | 2/2003 | Kelley et al. | 703/13 |
| 6,611,892 | B1* | 8/2003 | Sasaki et al. | 710/306 |
| 6,658,519 | B1* | 12/2003 | Broberg, III et al. | 710/311 |
| 6,725,301 | B1* | 4/2004 | Gholami et al. | 710/62 |
| 6,799,238 | B1* | 9/2004 | Miller | 710/302 |
| 2002/0052727 | A1* | 5/2002 | Bond et al. | 703/26 |

OTHER PUBLICATIONS

PCI Local Specification, 1995, PCI SGI, Ver. 2.1, pp 2-5, 123-124, and 141.*

Technobox Part No. 2938 64-bit PMC to PCI Adapter for Delivery System, 2000, Technobox Inc.*

Technobox 32/64b 33/66 MHz PCI-X adapter, Technobox Inc.*

Technobox PMC to PCI Adapter—For Test, Technobox Inc.*

Processor PMC Standard, 1999, VSO, Draft 0.21.*

Controller Drivers 32-bit, 66 MHz, Hot-Swap PCI buses, Apr., 2001, Embedded In Electronic Design, p108.*

PCI bus 3.3V to 5V Converter / Adapter, Costronic Inc., http://www.costronic.com/tw/Ev09p35.htm.*

\* cited by examiner

METHODS AND APPARATUS FOR SIGNALING TO SWITCH BETWEEN DIFFERENT BUS BANDWIDTHS

RELATED PATENTS

This patent application is a non-provisional patent application and claims priority under 35 U.S.C. §119 to U.S. Provisional Patent Serial No. 60/293,717 filed on May 24, 2001 entitled Method and Apparatus for Forcing 32 Bit PCI Pre-Configuration, hereinafter referred to as the "provisional" patent application. The provisional patent application is herein incorporated by reference.

BACKGROUND OF THE INVENTION

1. Field of the Invention

The present invention is directed generally toward a method and apparatus for forcing bus formats. More specifically, the present invention is directed to forcing bus configurations of a Peripheral Component Interconnect (PCI) device.

2. Discussion of Related Art

As technology in the field of microprocessors progresses, capabilities of microprocessors to handle more data increase. Typical microprocessors presently operate on 64 bits of parallel data or greater. Many microprocessors are used in systems that include and communicate with other devices via interface buses. Peripheral Component Interconnect (PCI) is one common interface bus frequently used in such systems. As used herein, a PCI device is a device capable of being coupled to a PCI bus.

PCI devices are typically connected to a PCI bus on a motherboard with pin connectors, commonly referred to as "sockets" or "edge connectors". However, those skilled in the art will recognize that a PCI device may also be directly coupled to a PCI bus without a need for a pin connector. A microprocessor typically connected to the motherboard communicates with the PCI devices through the PCI bus. The PCI bus includes a number of parallel data lines for transferring data and control signal between PCI devices. For example, a microprocessor that is capable of processing 64 bits of data can transfer 64 bits of data to a PCI device through a PCI bus that has 64 lines, provided that the PCI device is also capable of processing such data. Such a data bus is appropriately called a 64-bit PCI bus. Similarly, PCI devices can transfer 64 bits of data to the microprocessor through the 64-bit PCI bus.

PCI device technology advancements have maintained a corresponding pace with microprocessor technology advancements. However, a problem occurs when a PCI device is connected to a data bus that is incapable of transferring a required number of data bits from the PCI device. For example, a PCI device that is capable of transferring 64 bits of data will experience data errors when attempting to transfer 64 bits of data through a 32-bit PCI bus. While technology of PCI devices has progressed, many PCI devices are used to communicate through data buses that are incapable of transferring a higher number of data bits from the PCI devices.

PCI specifications have requirements that allow PCI devices to communicate the number of bits to be processed between a PCI device and a PCI bus. Bus-width control signals that include a request for communications and an acknowledgement of communications are transmitted to establish a bus-width for communications with respect to a number of bits. If the PCI device is to communicate through a PCI bus on a motherboard that transfers a lesser number of bits, PCI specifications require that a "pull-up" resistor be placed on the motherboard. The "pull-up" resistor pulls a voltage level for the request and the acknowledgement to a logical high, thereby formatting the bus and forcing the PCI device to transfer the lesser number of bits.

An example of PCI specifications is the PCI 2.2 specification. The PCI 2.2 specification requires that 32-bit connectors, such as 32-bit PCI card slots, have bus-formatting "pull-up" resistors to pull a request for 64-bit bus communications and/or an acknowledgement of 64-bit bus communications to logical 1. If the request for 64-bit bus communication is not pulled high, the request for 64-bit bus communication floats and potentially causes an improper request for 64-bit communications when 32-bit communications are desired and/or necessary. An acknowledgement of 64-bit communications acts in a similar manner.

Many legacy motherboards have PCI bus systems designed for 32-bit communications that pre-date the PCI 2.2 specifications. PCI 2.2 specifications require that PCI buses employ the bus-formatting "pull-up" resistors when a 32-bit bus interfaces with a 64-bit PCI device. Legacy motherboards are considered to be non-compliant or non-compatible when the legacy motherboards do not meet the PCI 2.2 specifications. Placing the bus-formatting "pull-up" resistors on a PCI device violates the PCI 2.2 specifications. Alternatively, permanently forcing the request for 64-bit bus communications and/or the acknowledgement of 64-bit bus communications to a logical 1 would force a PCI device to permanently operate as a 32-bit PCI device. Permanently operating the 64-bit PCI device as a 32-bit PCI device precludes a future use as a 64-bit PCI device. Therefore, a device is needed to control the number of bits to be transferred from the PCI device through a PCI bus. The device should also comply with both present and past PCI specifications relating to an existence and a location of "pull-up" resistors.

SUMMARY OF THE INVENTION

The present invention solves the above and other problems and advances the state of the useful arts by providing an apparatus and method for selecting bus-width formats. In an exemplary preferred embodiment of the invention, the circuit includes a bus controller configured to provide a first bus-width control signal to select a first bus-width. The circuit also includes a bus controller extension circuit configured to force the first bus-width control signal to a predetermined level when the bus controller is applied to a bus with a second bus controller that is incompatible with the first bus-width. An example of bus-width formats includes Peripheral Component Interconnect (PCI) specifications that mandate a number and manner in which bits are transferred over a PCI bus. An example of a PCI specification is the PCI 2.2 specification.

In one aspect of the invention, the first bus-width control signal includes a request for 64-bit PCI bus communication.

In another aspect of the invention, the bus controller extension circuit includes a force controller having an output configured to provide a force control signal for forcing the first bus-width control signal to the predetermined level.

In another aspect of the invention, the bus controller extension circuit includes a first buffer having an input configured for receiving the first bus-width control signal. The bus controller extension circuit also includes a first logic gate having a first input coupled to an output of the first buffer and a second input configured for receiving the force control signal. The bus controller extension circuit also includes a second buffer having an input coupled to an output of the first logic gate.

In another aspect of the invention, the first logic gate includes a NOR gate.

In another aspect of the invention, the bus controller extension circuit includes an inverter having an input coupled to the output of the first logic gate.

In another aspect of the invention, the bus controller extension circuit includes a third buffer having an input coupled to receive a second bus-width control signal. The bus controller extension circuit also includes a second logic gate having a first input coupled to an output of the third buffer and a second input configured for receiving the force control signal. The bus controller extension circuit also includes a fourth buffer having an input coupled to an output of the second logic gate.

In another aspect of the invention, the second bus-width control signal includes an acknowledgement of 64-bit PCI bus communication.

In another aspect of the invention, the second logic gate includes a NOR gate.

In another aspect of the invention, the bus controller extension circuit includes an inverter having an input coupled to the output of the second logic gate.

In another aspect of the invention, the bus with the second bus controller includes a 32-bit data bus.

In another aspect of the invention, the bus controller extension circuit includes a sensor circuit configured to detect a level of the first bus-width control signal.

In another aspect of the invention, the sensor circuit includes a comparator having an input configured to receive the first bus-width control signal.

In another aspect of the invention, the sensor circuit includes a comparator having an input configured to receive the second bus-width control signal for detecting a level of the second bus-width control signal.

In another aspect of the invention, the sensor circuit includes a logic gate configured to receive and detect the first bus-width control signal and the second bus-width control signal.

Advantages of the invention include controlling a number of data bits to be transferred between a PCI device and a data bus that does not violate PCI specifications. Other advantages include a programmability of the PCI device to adapt to legacy systems as PCI technology progresses.

BRIEF DESCRIPTION OF THE PREFERRED EMBODIMENTS

The same reference number represents the same element on all drawings.

DETAILED DESCRIPTION OF THE PREFERRED EMBODIMENTS

Figure 1:
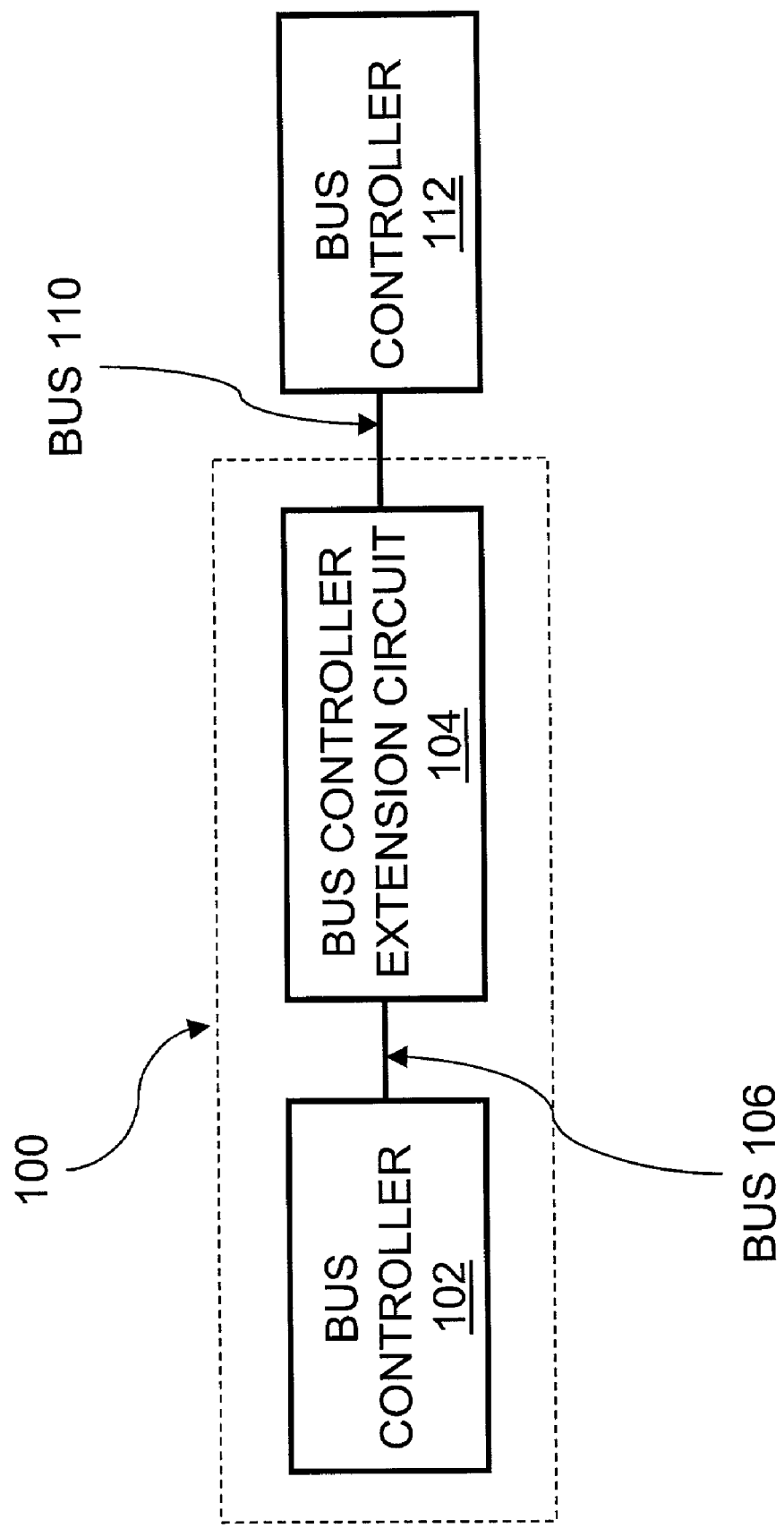
FIG. 1 is a block diagram illustrating an example of the invention.

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, a block diagram illustrates circuit 100 in an example of the invention. Circuit 100 is configured to select bus-width formats and includes bus controller 102 and bus controller extension circuit 104. Bus controller 102 is coupled to bus controller extension circuit 104 through bus 106. Bus controller extension circuit 104 is coupled to bus controller 112 through bus 110.

Bus controller 102 is any device, system, or circuit configured to provide a first bus-width control signal to select a first bus-width. Bus controller extension circuit 104 is any circuit configured to force the first bus-width control signal to a predetermined level when the bus controller is applied to bus 110 with a second bus controller that is incompatible with the first bus-width.

The first bus-width control signal includes any electrical or electromagnetic signal used to control a bus-width. The predetermined level includes a predetermined voltage level. A bus includes any wire or link configured to transfer signals. A bus-width includes a number of bits that are transferred over the bus. An example of bus-width formats includes Peripheral Component Interconnect (PCI) specifications that mandate a number and manner in which bits are transferred over a PCI bus. An example of a PCI specification is the PCI 2.2 specification. Based on this disclosure, those skilled in the art will know how to make and use bus controller 102 and bus controller extension circuit 104.

Figure 2:
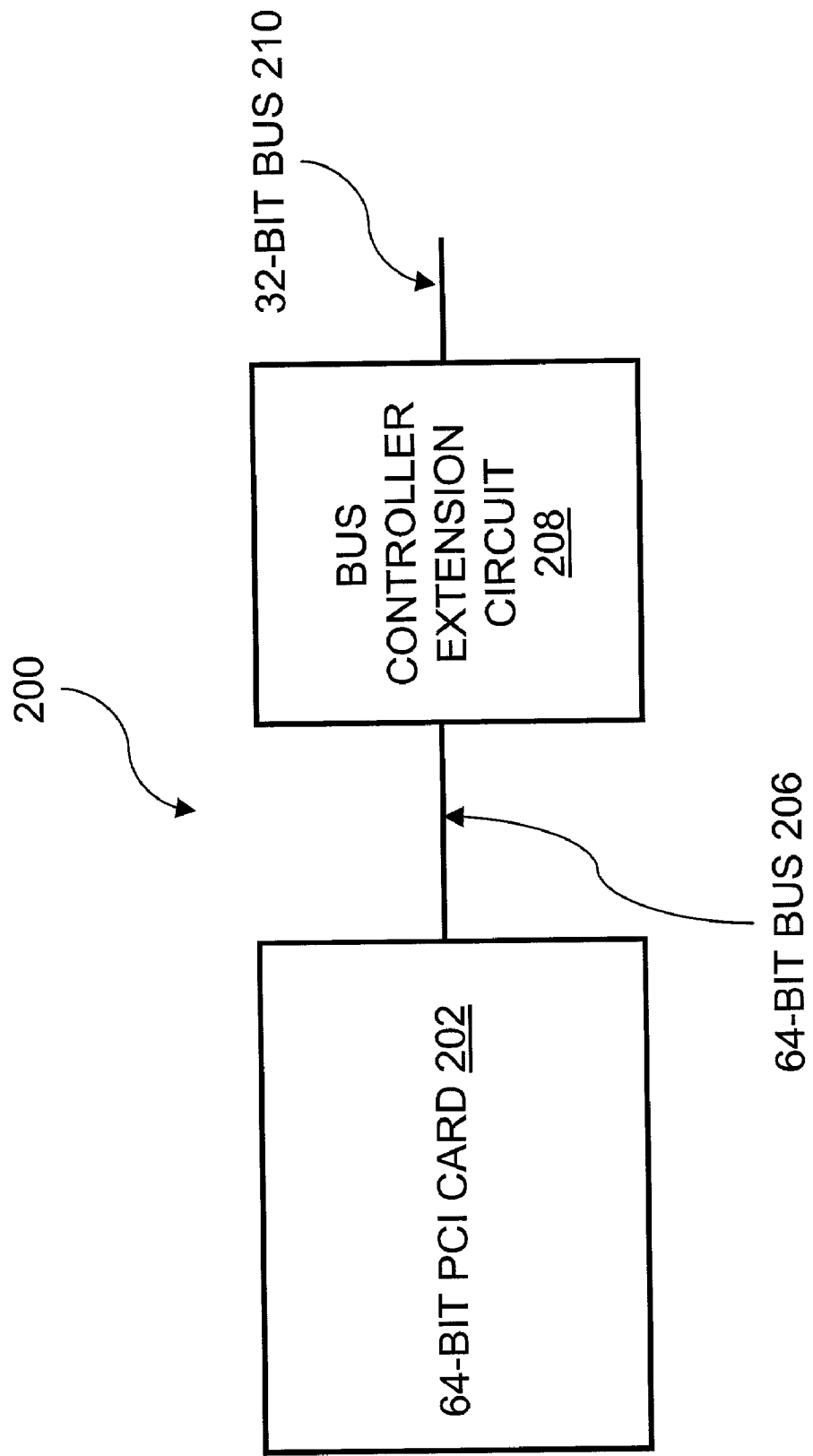
FIG. 2 is a block diagram illustrating an exemplary embodiment of the invention.

FIG. 2 illustrates a block diagram of a first exemplary preferred embodiment 200. Exemplary embodiment 200 includes 64-bit Peripheral Component Interconnect (PCI) card 202, bus controller extension circuit 208, 64-bit PCI bus 206, and 32-bit PCI bus 210. Bus controller extension circuit 208 is connected to 64-bit PCI card 202 through 64-bit PCI bus 206. Bus controller extension circuit 208 operates to force a first bus-width control signal from 64-bit PCI card 202 to a predetermined voltage level. The first bus-width control signal includes a request for 64-bit bus communications when the first bus-width control signal is active low, or logical 0. PCI bus communications operate in a 32-bit mode when the first bus-width control signal is high, or logical 1. Bus controller extension circuit 208 forces the first bus-width control signal to a logical 1 when 64-bit PCI card 202 communicates with a non-compatible 32-bit PCI bus on a motherboard, described below.

Bus controller extension circuit 208 also operates to force a second bus-width control signal from 64-bit PCI card 202 to a predetermined voltage level. The second bus-width control signal includes an acknowledgement of 64-bit bus communications when the second bus-width control signal is active low, or logical 0. PCI bus communications operate in a 32-bit mode when the second bus-width control signal is high, or logical 1. Bus controller extension circuit 208 forces the second bus-width control signal to a logical 1 when 64-bit PCI card 202 communicates with a non-compatible 32-bit PCI bus on a motherboard, described below. A non-compatible 32-bit PCI bus is a bus that does not comply with PCI specifications of the 64-bit PCI card. An example of the non-compatible 32-bit PCI bus is 32-bit bus 210. An example of a PCI specification is PCI specification 2.2.

Figure 3:
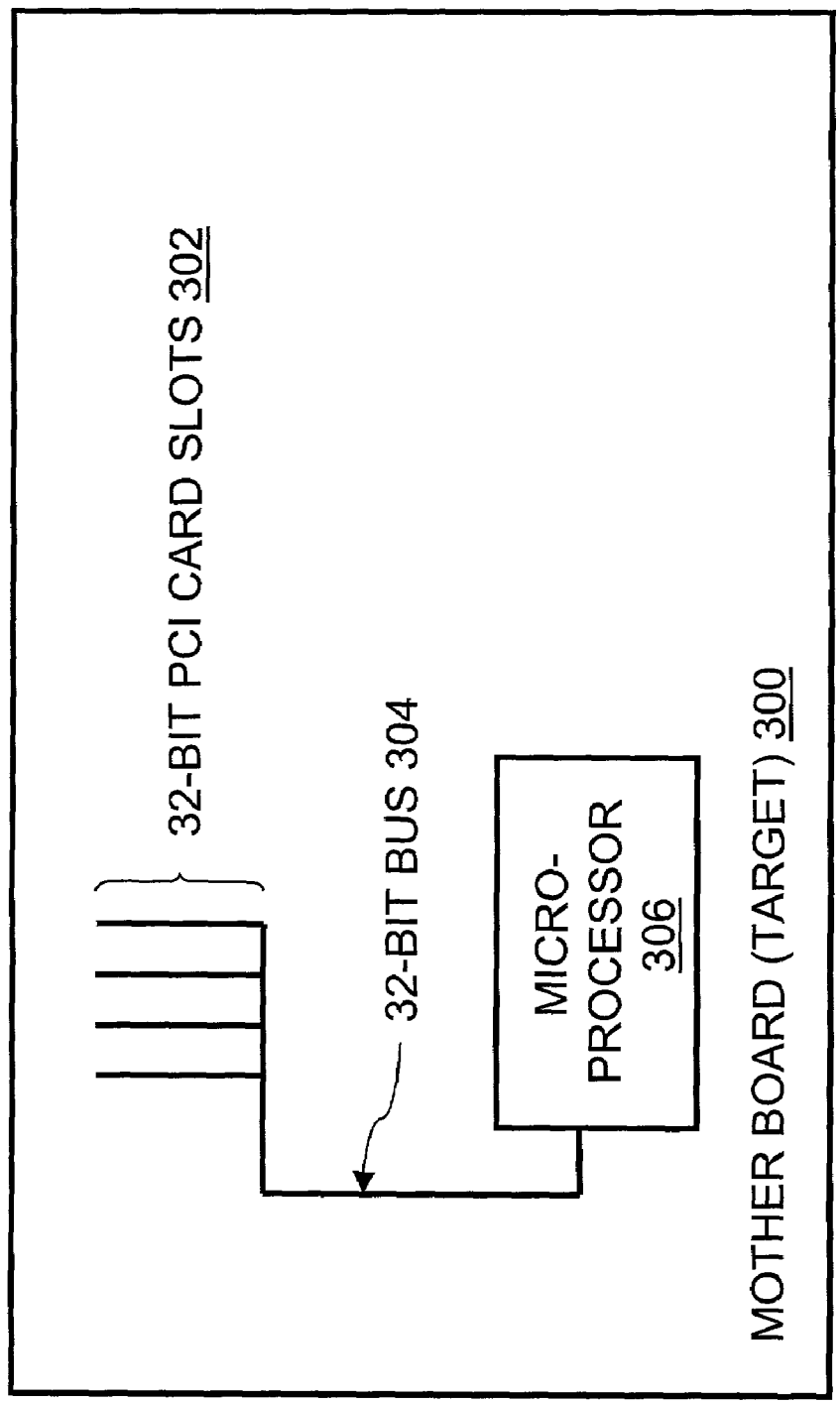
FIG. 3 is a block diagram illustrating an exemplary target for the invention.

FIG. 3 illustrates a block diagram of target 300 as is presently known in the prior art. Target 300 is a motherboard that includes microprocessor 306, 32-bit bus 304, and 32-bit PCI card slots 302. Microprocessor 306 is connected to 32-bit PCI card slots 302 through 32-bit bus 304. Microprocessor 306 communicates with a PCI device, such as PCI card 202 described in FIG. 2, connected to one of PCI card slots 302 through 32-bit bus 304.

PCI 2.2 specification requires that 32-bit connectors, such as 32-bit PCI card slots, have bus-formatting "pull-up" resistors to pull a request for 64-bit bus communications and/or an acknowledgement of 64-bit bus communications to logical 1, thereby causing 32-bit communications. If the request for 64-bit bus communication is not pulled high, the request for 64-bit bus communication floats and potentially causes an improper request for 64-bit communications when 32-bit communications are desired and/or necessary. The acknowledgement of 64-bit communications acts in a similar manner.

Many legacy motherboards, such as target 300, have PCI bus systems designed for 32-bit communications that pre-date PCI 2.2 specifications. PCI 2.2 specifications require that PCI buses employ bus-formatting "pull-up" resistors when a 32-bit PCI bus interfaces with the 64-bit PCI device. Legacy motherboards are considered to be non-compliant or non-compatible when the legacy motherboards do not meet the PCI 2.2 specifications. However, placing bus-formatting "pull-up" resistors on a PCI device violates the PCI 2.2 specifications. Alternatively, permanently forcing the request for 64-bit bus communications and/or the acknowledgement of 64-bit bus communications to a logical 1 would force a PCI device to permanently operate as a 32-bit PCI device. Permanently operating the 64-bit PCI device as a 32-bit PCI device precludes a future use as a 64-bit PCI device. Bus controller extension circuit 208, described in FIG. 2, provides a means to address 32-bit communication between 64-bit PCI card 202 and non-compatible target 300.

Figure 4:
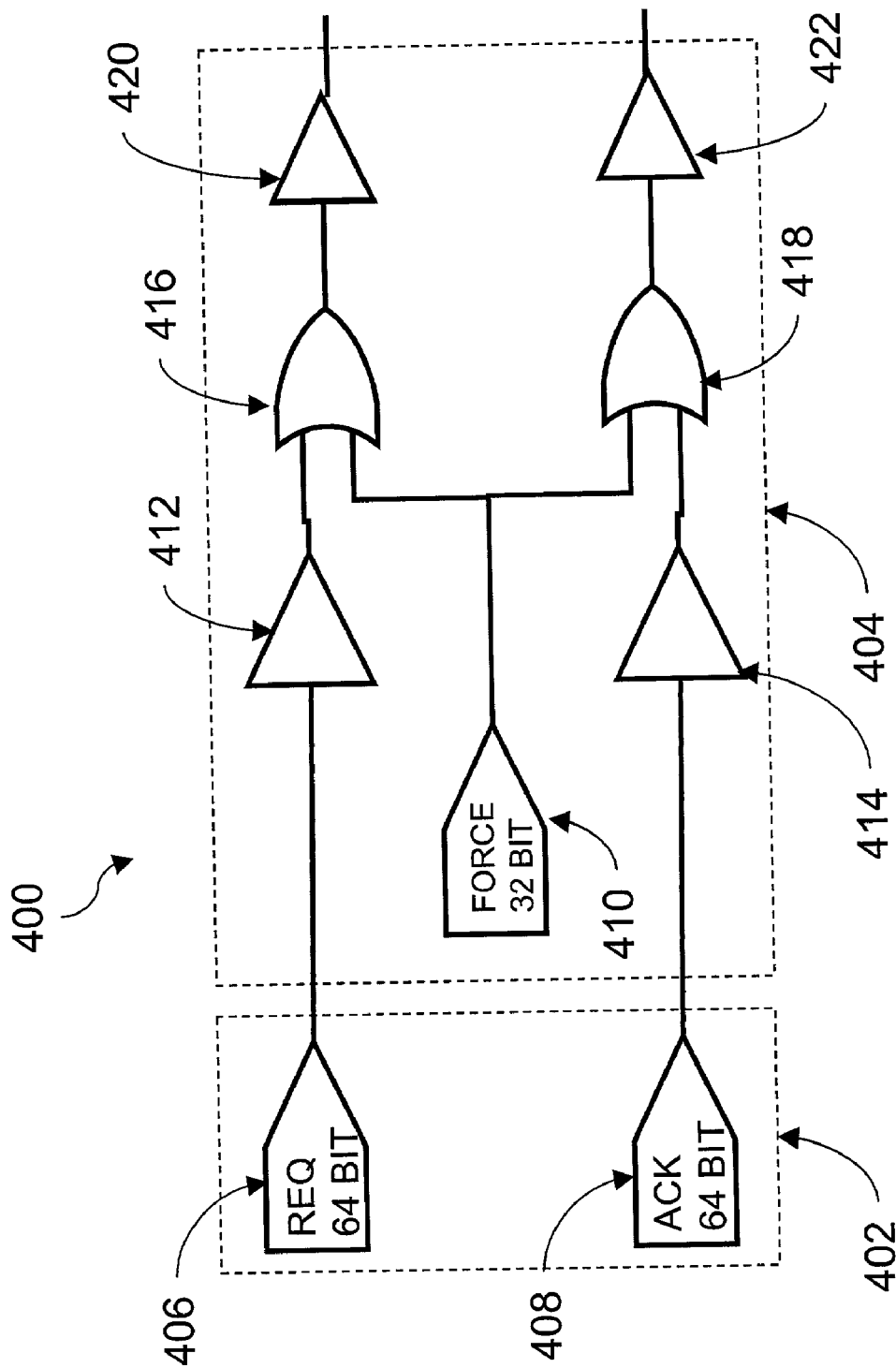
FIG. 4 is a logic diagram illustrating an example of the invention.

FIG. 4 illustrates logic diagram 400 in an exemplary preferred embodiment of the invention. Logic diagram 400 includes bus controller logic 402 and bus controller extension logic 404. Bus controller logic 402 includes register 406 and register 408. Bus controller extension logic 404 includes register 410, buffer 412, buffer 414, buffer 420, buffer 422, OR gate 416, OR gate 418. Register 406 stores a first bus-width control signal that requests 64-bit bus communications. Register 408 stores a second bus control that acknowledges 64-bit bus communications. Register 410 stores a force control signal to force the first bus-width control signal and the second bus-width control signal to a logical 1 and force 32-bit communication between a 64-bit PCI card, such as 64-bit PCI card 202 described in FIG. 2, and a non-compatible motherboard, such as target 300 described in FIG. 3.

Register 406 is connected to an input of buffer 412. Register 408 is connected to an input of buffer 414. Buffer 412 has an output connected to first input of OR gate 416. Buffer 414 has an output connected to a first input of OR gate 418. Register 410 is connected to a second input of OR gate 416. Register 410 is also connected to a second input of OR gate 418. OR gate 416 has an output connected to an input of buffer 420. OR gate 418 has an output connected to an input of buffer 422.

Operation of logic diagram 400 follows. A first bus-width control signal of register 406 is transferred to buffer 412. Buffer 412 transfers the first bus-width control signal to the first input of OR gate 416. A force control signal of register 410 is transferred to the second input of OR gate 416. The first bus-width control signal and the force control signal are logically OR combined. When the force control signal is a logical 1, a resultant first bus-width control signal is outputted from OR gate 416 as a logical 1. The output of OR gate 416 is transferred to a target device through buffer 420.

A second bus-width control signal of register 408 is transferred to buffer 414. Buffer 414 transfers the second bus-width control signal to the first input of OR gate 418. The force control signal of register 410 is also transferred to the second input of OR gate 418. The second bus-width control signal and the force control signal are logically OR combined. When the force control signal is a logical 1, a resultant second bus-width control signal is outputted from OR gate 418 as a logical 1. The output of OR gate 418 is transferred to a target device through buffer 422.

Figure 5:
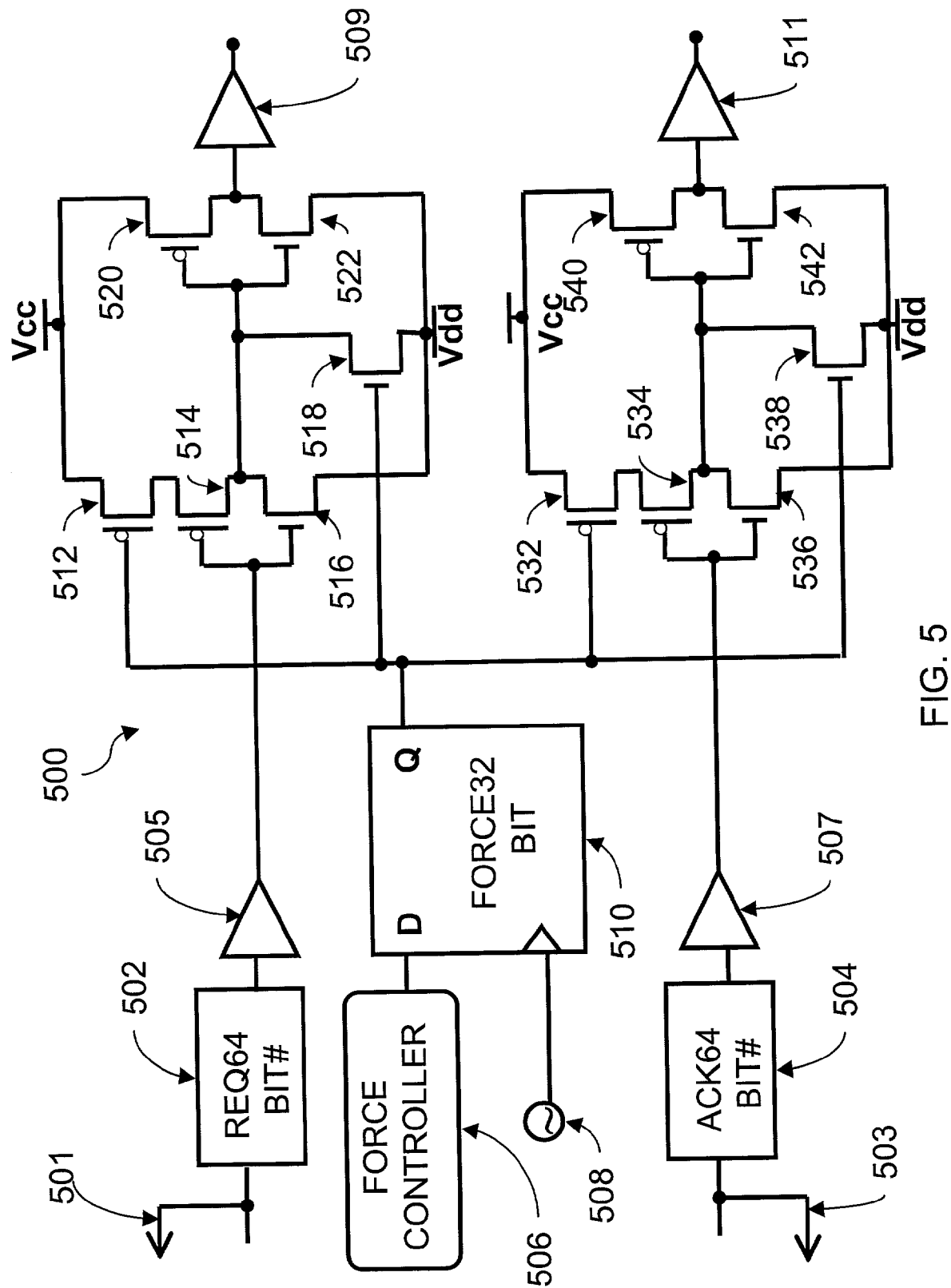
FIG. 5 is a schematic diagram illustrating an example of the invention.

FIG. 5 illustrates schematic diagram 500 in an exemplary preferred embodiment of the invention. Circuit diagram 500 includes REQ64BIT# register 502 and ACK64BIT# register 504, where the # symbol represents active low. Circuit diagram 500 also includes force controller 506, clock 508, D-flip/flop 510, buffer 505, buffer 507, P-type Metal Oxide Semiconductor Field Effect Transistor 512 (MOSFET), P-type MOSFET 514, P-type MOSFET 520, P-type MOSFET 532, P-type MOSFET 534, P-type MOSFET 540, N-type MOSFET 516, N-type MOSFET 518, N-type MOSFET 522, N-type MOSFET 536, N-type MOSFET 538, N-type MOSFET 542, buffer 509, and buffer 511. Force controller 506 can be a microprocessor.

Register 502 is connected to an input of buffer 505. Buffer 505 has an output connected to a gate terminal of P-type MOSFET 514 and to a gate terminal of N-type MOSFET 516. Register 504 is connected to an input of buffer 507. Buffer 507 has an output connected to a gate terminal of P-type MOSFET 534 and to a gate terminal of N-type MOSFET 536.

Force controller 506 has an output connected to a "D" input of D-flip/flop 510. Clock 508 is connected to a clock input of D-flip/flop 510. A "Q" output of D-flip/flop 510 is connected to gate terminals of P-type MOSFET 512, N-type MOSFET 518, P-type MOSFET 532, and N-type MOSFET 538.

P-type MOSFET 512 has a source terminal connected to a first power supply, $V_{cc}$, and a drain terminal connected to a source terminal of P-type MOSFET 514. P-type MOSFET 514 has a drain terminal connected to a drain terminal of N-type MOSFET 516. N-type MOSFET 516 has a source terminal connected to a second power supply, $V_{dd}$. N-type MOSFET 518 has a source terminal connected to the second power supply and a drain terminal connected to the drain terminal of P-type MOSFET 514. MOSFET's 512, 514, 516, and 518 are configured to perform a function of a logical NOR gate.

P-type MOSFET 520 has a gate terminal connected to the drain terminal of N-type MOSFET 518, a source terminal connected to the first power supply, and a drain terminal connected to an input of buffer 509. N-type MOSFET 522 has a gate terminal connected to the drain terminal of N-type MOSFET 518, a source terminal connected to the second power supply, and a drain terminal connected to the input of buffer 509. MOSFET's 520 and 522 are configured to perform a function of an inverter.

P-type MOSFET 532 has a source terminal connected to the first power supply and a drain terminal connected to a source terminal of P-type MOSFET 534. P-type MOSFET 534 has a drain terminal connected to a drain terminal of N-type MOSFET 536. N-type MOSFET 536 has a source terminal connected to the second power supply. N-type MOSFET 538 has a source terminal connected to the second power supply and a drain terminal connected to the drain terminal of P-type MOSFET 534. MOSFET's 532, 534, 536, and 538 are configured to perform the function of a logical NOR gate.

P-type MOSFET 540 has a gate terminal connected to the drain terminal of N-type MOSFET 538, a source terminal connected to the first power supply, and a drain terminal connected to an input of buffer 511. N-type MOSFET 542 has a gate terminal connected to the drain terminal of N-type MOSFET 538, a source terminal connected to the second power supply, and a drain terminal connected to the input of buffer 511. MOSFET's 540 and 542 are configured to perform a function of an inverter.

Figure 6:
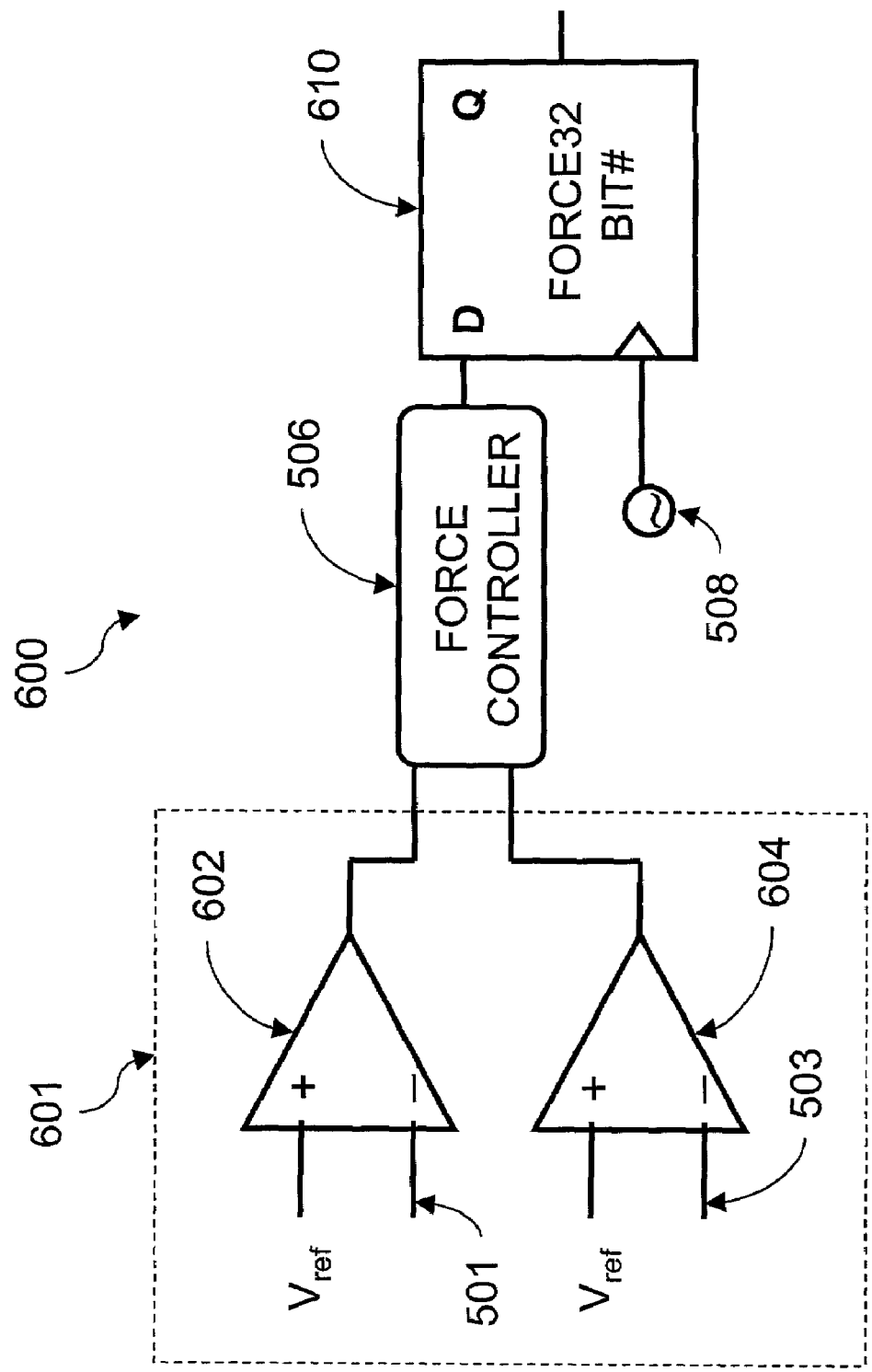
FIG. 6 is a schematic diagram illustrating a sensor in an example of the invention.

FIG. 6 illustrates schematic diagram 600 of sensor 601 in an example of the invention. Sensor 601 is configured to detect voltage levels on lines 501 and 503 from FIG. 5. By detecting voltage levels on lines 501 and 503, sensor 601 provides detection capabilities for a bus controller extension circuit, such as bus controller extension circuit 208 described in FIG. 2. The detection capabilities include detecting when a PCI device, such as 64-bit PCI card 202 described in FIG. 2, is connected to a non-compatible bus, such 32-bit bus 210 described in FIG. 2. Detecting when a PCI device is connected to a non-compatible bus is desirable as detection makes the PCI device substantially adaptable as PCI specifications change over time. Once a non-compatible bus is detected, the PCI device can be programmed to operate in a different manner.

Sensor 601 includes comparator 602 and comparator 604. Comparator 602 has a non-inverting input connected to a power supply, $V_{ref}$, and an inverting input connected to line 501 from FIG. 5. Comparator 602 is configured to detect a level of a bus-width control signal from a target, such as target 300 of FIG. 3, transmitted on line 501 that floats below a logical 1 voltage level and causes an improper request for 64-bit bus communications. Force controller 506 receives and processes an output of comparator 602 to provide a force control signal of logical 1 to the "D" input of D-flip/flop 510.

Comparator 602 has an output connected to force controller 506. Comparator 604 has a non-inverting input connected to the power supply and an inverting input connected to line 503 from FIG. 5. Comparator 604 has an output connected to force controller 506. Comparator 604 is configured to detect a level of a bus-width control signal from the target transmitted on line 503 that floats below a logical 1 voltage level and causes an improper acknowledgement of 64-bit bus communications. Force controller 506 receives and processes an output of comparator 602 to provide a force control signal of logical 1 to the "D" input of D-flip/flop 510.

Instructions that operate force controller 506 can be stored on storage media. The instructions can be retrieved and executed by force controller 506. Some examples of instructions are software, program code, and firmware. Some examples of storage media are memory devices, tapes, disks, integrated circuits, and servers. The instructions are operational when executed by force controller 506 to direct force controller 506 to operate in accord with the invention. Those skilled in the art are familiar with instructions and storage media.

Advantages of the above invention include controlling a number of data bits to be transferred between a PCI device and a data bus that does not violate PCI specifications. Other advantages include a programmability of the PCI device to adapt to legacy systems as PCI technology progresses.

While the invention has been illustrated and described in the drawings and foregoing description, such illustration and description is to be considered as exemplary and not restrictive in character. One embodiment of the invention and minor variants thereof have been shown and described. All changes and modifications that come within the spirit of the invention are desired to be protected. Those skilled in the art will appreciate variations of the above-described embodiments that fall within the scope of the invention. As a result, the invention is not limited to the specific examples and illustrations discussed above, but only by the following claims and their equivalents.

What is claimed is:

1. An apparatus for selecting bus-width formats, comprising:
 a first bus controller configured to provide receive a first bus-width control signal to select a first bus-width wherein said first bus controller is compliant with Peripheral Computer Interconnect Bus Specifications version 2.2 as regards said first bus-width control signal; and
 a bus controller extension circuit configured to force the first bus-width control signal to a predetermined level when the first bus controller is applied to a bus with a second bus controller that is incompatible with the first bus-width wherein the second bus controller and the bus adhere to Peripheral Computer Interconnect Bus standards that pre-date the Peripheral Computer Interconnect Bus Specifications version 2.2 and do not adhere to Peripheral Computer Interconnect Bus Specifications version 2.2 as regards said first bus-width control signal wherein the second bus controller does not adhere in that it provides no bus-width control signal and wherein the bus adheres to Peripheral Computer Interconnect Bus Specifications that pre-date version 2.2 and hence does not include a bus-width control signal.

2. The apparatus of claim 1, wherein the first bus-width control signal comprises a request for 64-bit Peripheral Component Interconnect (PCI) bus communication.

3. The apparatus of claim 1, wherein the bus controller extension circuit comprises a force controller having an output configured to provide a force control signal for forcing the first bus-width control signal to the predetermined level.

4. The apparatus of claim 1, wherein the bus controller extension circuit comprises:
 a first buffer having an input configured for receiving the first bus-width control signal;
 a first logic gate having a first input coupled to an output of the first buffer and a second input configured for receiving a force control signal; and
 a second buffer having an input coupled to an output of the first logic gate.

5. The apparatus of claim 4, wherein the first logic gate comprises a NOR gate.

6. The apparatus of claim 4, wherein the bus controller extension circuit further comprises an inverter having an input coupled to the output of the first logic gate.

7. The apparatus of claim 4, wherein the bus controller extension circuit further comprises:
   a third buffer having an input coupled to receive a second bus-width control signal;
   a second logic gate having a first input coupled to an output of the third buffer and a second input configured for receiving the force control signal; and
   a fourth buffer having an input coupled to an output of the second logic gate.

8. The apparatus of claim 7, wherein the second bus-width control signal comprises an acknowledgement for 64-bit PCI bus communication.

9. The apparatus of claim 7, wherein the second logic gate comprises a NOR gate.

10. The apparatus of claim 7, wherein the bus controller extension circuit further comprises an inverter having an input coupled to the output of the second logic gate.

11. The apparatus of claim 1, wherein the bus with the second bus controller comprises a 32-bit data bus.

12. The apparatus of claim 1, wherein the bus controller extension circuit comprises a sensor circuit configured to detect a level of the first bus-width control signal.

13. The apparatus of claim 12, wherein the sensor circuit comprises a comparator having an input configured to receive the first bus-width control signal.

14. The apparatus of claim 12, wherein the sensor circuit comprises a comparator having an input configured to receive a second bus-width control signal for detecting a level of the second bus-width control signal.

15. The apparatus of claim 14, wherein the sensor circuit comprises a logic gate configured to receive detected levels of the first bus-width control signal and the second bus-width control signal.

16. A method for selecting bus-width formats, comprising steps of:
   providing a first bus-width control signal to select a first bus-width wherein said control signal is received by a first bus controller compliant with Peripheral Computer Interconnect Bus Specifications version 2.2 as regards said first bus-width control signal;
   generating a force control signal; and
   combining the first bus-width control signal and the force control signal to force the first bus-width control signal to a predetermined level when the first bus controller is applied to a bus with a second bus controller that is incompatible with the first bus-width wherein the second bus controller and the bus adhere to Peripheral Computer Interconnect Bus standards that pre-date the Peripheral Computer Interconnect Bus Specifications version 2.2 and do not adhere to the Peripheral Computer Interconnect Bus Specifications version 2.2 as regards said first bus-width control signal wherein the second bus controller does not adhere in that it provides no bus-width control signal and wherein the bus adheres to Peripheral Computer Interconnect Bus Specifications that pre-date version 2.2 and hence does not include a bus-width control signal,
   wherein the force control signal is generated in a bus extension circuit coupled to the first bus controller and coupled to the second bus controller.

17. The method of claim 16, wherein the first bus-width control signal comprises a request for 64-bit Peripheral Component Interconnect (PCI) bus communication.

18. The method of claim 16, wherein the step of combining comprises logically combining the first bus-width control signal and the force control signal by means of an OR gate.

19. The method of claim 16 further comprises a step of providing a second bus-width control signal.

20. The method of claim 19, wherein the second bus-width control signal comprises an acknowledgement of 64-bit PCI bus communication.

21. The method of claim 19, further comprises a step of combining the second bus-width control signal and the force control signal to force the second bus-width control signal to a predetermined level.

22. The method of claim 21, wherein the step of combining comprises logically combining the second bus-width control signal and the force control signal by means of an OR gate.

23. The method of claim 16, wherein the bus with the second bus controller comprises a 32-bit data bus.

24. The method of claim 16, further comprises detecting a level of the first bus-width control signal.

25. The method of claim 16, further comprises detecting a level of the second bus-width control signal.

26. A circuit for adapting a 64-bit PCI device to a 32-bit target, comprising:
   a bus controller configured to provide a first bus-width control signal and a second bus-width control signal, wherein the first bus-width control signal includes a request for 64-bit communication and the second bus-width control signal includes an acknowledgement of 64 bit communication; and
   a bus controller extension circuit configured to provide a force control signal and force the first bus-width control signal and the second bus-width control signal to a predetermined level, wherein the bus controller extension circuit includes
   a first buffer having an input configured for receiving the first bus-width control signal,
   a first OR gate having a first input coupled to an output of the first buffer and a second input configured for receiving the force control signal,
   a second buffer having an input coupled to an output of the first OR gate
   a third buffer having an input configured for receiving the second bus-width control signal,
   a second OR gate having a first input coupled to an output of the third buffer and a second input configured for receiving the force control signal,
   a fourth buffer having an input coupled to an output of the second OR gate, and
   a sensor circuit that includes a first comparator and a second comparator for respectively detecting voltage levels of the first bus-width control signal and the second bus-width control signal.

* * * * *